(12) United States Patent
McDeed et al.

(10) Patent No.: US 11,623,181 B2
(45) Date of Patent: *Apr. 11, 2023

(54) METHOD AND APPARATUS FOR OPERATING A GAS TURBINE POWER PLANT AT LOW LOAD CONDITIONS WITH STACK COMPLIANT EMISSIONS LEVELS

(71) Applicant: MITSUBISHI HITACHI POWER SYSTEMS AMERICAS, INC., Lake Mary, FL (US)

(72) Inventors: David McDeed, Lake Mary, FL (US); George Pyros, Lake Mary, FL (US); Anthony Bravato, Lake Mary, FL (US)

(73) Assignee: MITSUBISHI POWER AMERICAS, INC., Lake Mary, FL (US)

( * ) Notice: Subject to any disclaimer, the term of this patent is extended or adjusted under 35 U.S.C. 154(b) by 634 days.

This patent is subject to a terminal disclaimer.

(21) Appl. No.: 15/724,344

(22) Filed: Oct. 4, 2017

(65) Prior Publication Data

US 2018/0021727 A1    Jan. 25, 2018

Related U.S. Application Data

(63) Continuation-in-part of application No. 14/496,835, filed on Sep. 25, 2014, now abandoned.

(Continued)

(51) Int. Cl.
*B01D 53/94* (2006.01)
*F01N 13/00* (2010.01)
(Continued)

(52) U.S. Cl.
CPC ....... *B01D 53/9477* (2013.01); *B01D 53/944* (2013.01); *B01D 53/9418* (2013.01);
(Continued)

(58) Field of Classification Search
CPC ........... B01D 53/9477; B01D 53/9418; B01D 53/944; B01D 53/9495; F01N 13/0093;
(Continued)

(56) References Cited

U.S. PATENT DOCUMENTS 7,107,774 B2    9/2006  Radovich
7,638,107 B1*  12/2009  Wirt .................. B01D 53/8631
                                                    422/168

(Continued)

FOREIGN PATENT DOCUMENTS

CN     101813026 A     8/2010
CN     102245281 A    11/2011
(Continued)

OTHER PUBLICATIONS

Capital and O & M Benefits of Advanced Multi-Function Catalyst Technology for Combustion Turbine Power Plants—Sobolevskiy 2015 (Sobolevsky).*

(Continued)

*Primary Examiner* — Loren C Edwards
(74) *Attorney, Agent, or Firm* — WHDA, LLP

(57) ABSTRACT

An apparatus for a gas turbine power plant that uniquely configures emission control equipment such that the plant can extend the emissions compliant operational range, the apparatus including a plurality of oxidation (CO) catalysts arranged in series.

1 Claim, 2 Drawing Sheets

Related U.S. Application Data

(60) Provisional application No. 61/928,897, filed on Jan. 17, 2014.

(51) Int. Cl.

| | | |
|---|---|---|
| *F01N 3/20* | (2006.01) | |
| *F23G 7/07* | (2006.01) | |
| *F16T 1/00* | (2006.01) | |
| *F01D 25/30* | (2006.01) | |
| *F23J 15/02* | (2006.01) | |

(52) U.S. Cl.
CPC ......... *B01D 53/9495* (2013.01); *F01D 25/30* (2013.01); *F01N 3/208* (2013.01); *F01N 13/0093* (2014.06); *F16T 1/00* (2013.01); *F23G 7/07* (2013.01); *F23J 15/02* (2013.01); *F01N 2610/02* (2013.01); *F01N 2900/08* (2013.01); *F05D 2270/082* (2013.01); *F23J 2215/10* (2013.01); *F23J 2215/40* (2013.01); *F23J 2219/10* (2013.01); *Y02E 20/12* (2013.01); *Y02E 20/16* (2013.01)

(58) Field of Classification Search
CPC ............. F01N 2610/02; F01N 2900/08; F01N 13/208; F01N 3/208; F01N 9/00
USPC .................. 60/772, 778; 422/168, 169, 171; 423/210
See application file for complete search history.

(56) References Cited

U.S. PATENT DOCUMENTS

| | | | |
|---|---|---|---|
| 7,749,938 B2 | 7/2010 | Obayashi et al. | |
| 8,453,461 B2 | 6/2013 | Draper | |
| 9,101,877 B2* | 8/2015 | Sobolevskiy | B01J 23/22 |
| 2002/0141909 A1* | 10/2002 | Takayama | B01D 53/864 |
| | | | 422/168 |
| 2005/0034445 A1 | 2/2005 | Radovich | |
| 2005/0118084 A1 | 6/2005 | Cichanowicz | |
| 2006/0179824 A1 | 8/2006 | Roser | |
| 2008/0016852 A1 | 1/2008 | Shamis | |
| 2008/0112870 A1* | 5/2008 | Moini | B01D 53/8628 |
| | | | 423/237 |
| 2009/0035195 A1 | 2/2009 | Robel | |
| 2009/0199550 A1 | 8/2009 | Gloeckle et al. | |
| 2009/0282803 A1 | 11/2009 | Bono et al. | |
| 2010/0086458 A1 | 4/2010 | Kim et al. | |
| 2010/0215558 A1 | 8/2010 | Kraemer | |
| 2011/0217221 A1 | 9/2011 | Thogersen | |
| 2012/0047874 A1* | 3/2012 | Schmieg | B01D 53/9418 |
| | | | 60/274 |
| 2012/0073260 A1* | 3/2012 | Draper | F02C 1/06 |
| | | | 60/39.182 |
| 2012/0119512 A1* | 5/2012 | Draper | F02C 9/48 |
| | | | 290/1 R |
| 2014/0010748 A1 | 1/2014 | Kim | |
| 2014/0096532 A1* | 4/2014 | Broderick | F23J 15/003 |
| | | | 60/774 |
| 2014/0123672 A1* | 5/2014 | Huntington | F23D 14/20 |
| | | | 60/777 |
| 2016/0245139 A1* | 8/2016 | Repp | F22B 37/008 |
| 2017/0259209 A1* | 9/2017 | Nilsson | B01D 53/92 |
| 2017/0362983 A1* | 12/2017 | Nilsson | F01N 3/208 |
| 2018/0355776 A1* | 12/2018 | Kippel | F01N 3/208 |

FOREIGN PATENT DOCUMENTS

| | | | |
|---|---|---|---|
| CN | 102953819 A | | 3/2013 |
| DE | 4027329 A1 | | 3/1992 |
| JP | 2000264604 A | * | 9/2000 |
| JP | 2005231965 A | * | 9/2005 |
| JP | 2008-119651 A | | 5/2008 |
| JP | 2010-196708 A | | 9/2010 |
| JP | 2012-68014 A | | 4/2012 |
| KR | 101057342 B1 | | 8/2011 |
| WO | 2010/066345 A1 | | 6/2010 |

OTHER PUBLICATIONS

Office Action dated Nov. 28, 2017, issued in counterpart Japanese Application 2016-546767, with English translation (4 pages).
Office Action dated Jan. 9, 2018, issued in counterpart Japanese Application No. 2016-546767, with English translation (6 pages).
Extended Search Report dated Feb. 15, 2018, issued in counterpart European Application No. 15736954.7 (9 pages).
Office Action dated Feb. 16, 2018, issued in counterpart Colombian Application No. NC2016/0000886, with English translation (37 pages).
Office Action dated Jan. 12, 2018, issued in counterpart Chinese Application No. 201580014005.2, with English translation (28 pages).
International Search Report dated Apr. 17, 2015, issued in International Application No. PCT/US15/111563 (3 pages).
Written Opinion dated Apr. 17, 2015, issued in International Application No. PCT/US15/11563 (6 pages).
Notification Concerning Transmittal of International Preliminary Report on Patentability (Form PCT/IB/326) issued in counterpart International Application No. PCT/US2015/011563 dated Jul. 28, 2016 with forms PCT/IB/373, and PCT/ISA/237 (9 pages).
Office Action dated Sep. 9, 2016, issued in counterpart Colombian Patent Application No. NC2016/0000886. (4 pages).
Office Action dated May 31, 2017, issued in counterpart Chinese Patent Application 201580014005.2, with English translation. (31 pages).
Office Action dated Aug. 27, 2018, issued in counterpart Chinese Application No. 201580014005.2, with English translation (27 pages).
Office Action dated Aug. 29, 2018, issued in counterpart Colombian Application No. NC2016/0000886, with English translation (14 pages).
Office Action dated Mar. 25, 2019, issued in counterpart CN application No. 201580014005.2, with English translation. (15 pages).
Office Action dated May 31, 2019, issued in counterpart CO application No. NC2016/0000886. (4 pages).
Office Action dated Jul. 25, 2019, issued in counterpart CN application No. 201580014005.2, with English translation. (13 pages).
Office Action dated Mar. 12, 2020, issued in counterpart KR Application No. 10-2016-7021904, with English Translation. (8 pages).
Office Action dated Jul. 14, 2020, issued in counterpart MX application No. MX/a/2016/009240, with English translation. (6 pages).
Office Action dated Oct. 12, 2020, issued in counterpart EP Application No. 15 736 954.7 (4 pages).
Office Action dated Oct. 25, 2020, issued in counterpart KR Application No. 10-2016-7021904, with English translation (6 pages).
Office Action dated Dec. 4, 2020, issued in counterpart KR Application No. 10-2016-7021904, with English translation (6 pages).
Office Action dated Mar. 16, 2021, issued in counterpart CA application No. 2,937,162. (4 pages).
Office Action dated Mar. 5, 2021, issued in counterpart EP application No. 15 736 954.7. (3 pages).

* cited by examiner

METHOD AND APPARATUS FOR OPERATING A GAS TURBINE POWER PLANT AT LOW LOAD CONDITIONS WITH STACK COMPLIANT EMISSIONS LEVELS

CROSS-REFERENCE TO RELATED APPLICATION

This application is a continuation in part of U.S. application Ser. No. 14/496,835 filed Sep. 25, 2014, which is based upon and claims priority under 35 U.S.C. 119(e) to Provisional Application No. 61/928,897 filed Jan. 17, 2014, the contents of which are incorporated herein by reference in their entirety.

FIELD OF INVENTION

Gas turbine exhaust emissions increase significantly (up to a factor of 300) below a specific load of operation (typically less than 50%) to a point that traditional emissions control systems can not sufficiently destroy the NOx, CO and VOC generated. This results in the plant emissions exceeding the permit compliant levels, forcing the facility to shut down or increase load. This decision can hamper the operation of the electrical grid and significantly degrade the economics of the operating plant. Increasing the emissions compliant operational range by utilizing additional emission control equipment in strategic areas will benefit the grid stability and operational flexibility of the plant, as well as reduce the overall plant emissions generated during steady-state operation and during startups and shutdowns.

These concerns are becoming increasingly difficult to overcome as the penetration of intermittent renewable energy sources increase the flexibility, low-load requirements and the more frequent startups and shutdowns that the grid operators desire to impose on the gas turbine based power plants.

BACKGROUND OF THE INVENTION

FIG. 1 shows a conventional combined cycle plant with a gas turbine cycle 1 and a water/steam cycle 2. In the gas cycle 1, air comes into the air compressor 10 and is mixed with fuel F in the combustion chamber 11 and burned. The combustion products are then fed into the turbine section 13 causing the turbine shaft 14 to rotate the generator 15 which generates electricity.

Exhaust E from the gas turbine 13 enters the transition duct 19 that leads to the HRSG 20 and is cooled as it passes over the water/steam circuit, heating and boiling the water to steam. After it has given up the practical amount of energy (cooled) to the water/steam cycle, it is exhausted out the HRSG stack 21. It is here, in the exhaust stack, where emissions are measured for reporting to the Environmental Protection Agency (EPA) and determining emissions compliance.

The water/steam cycle 2 consists of the HRSG 20, the Steam Turbine (ST) 70, a generator 75, and a condenser 76. The ST 70 consists of a high-pressure ("HP") section 71, an intermediate-pressure ("IP") section 72, and a low-pressure ("LP") section 73. Illustrated is a three pressure Reheat system, also allocable are three Pressure Non-Reheat, two Pressure and one Pressure HRSGs and Boilers. The IP section is sometimes referred to as the reheat turbine. The three ST sections 70, and the generator 75, are all on a common shaft 74. When the steam flows through the ST 70, it turns the shaft 74 and electricity is generated by the generator 75. This steam exits the ST 70 and flows to the condenser 76.

As also shown in FIG. 1, a conventional combined cycle plant typical includes additional conventional elements, for example, low pressure condensate 22, low pressure (LP) economizer 23, LP steam drum 31, LP downcomer 32, LP evaporator 33, LP superheater 34, pipe to LP section (73) of ST 70 via line 35, LP bypass valve & de-superheater 37, IP economizer 40, IP steam drum 41, IP downcomer 42, IP evaporator 43, IP superheater 44, pipe to cold reheat pipe (61) 45, HP economizer 50, HP economizer 51, P downcomer 53, pipe to HP section (71) of ST 70 via line 56, HP bypass Valve & de-superheater 58, cold reheat pipe 61, hot reheat pipe to IP section (72) of ST 70 via line 63, RH bypass valve & de-superheater 65 and boiler feed pump 81, the operations of which are known and therefore not discussed in further detail.

During normal operation between full load and some minimum load, all the steam produced in the HRSG goes to the ST without pressure control (sliding pressure) and exits the ST LP section 73 into the condenser 76 where it is condensed into water to cycle back through the water/steam cycle 2 starting at pump 80.

The steam exiting the HRSG flows through valves [HP: 57, RH: 64 and LP: 36] going to the ST (ST inlet valves) to generate power as stated above. These valves can be used to control the pressure in water/steam circuit in their respective pressure levels if necessary under certain operating conditions.

The traditional configuration is to place all of this emissions control equipment downstream of the HP boiler drum in the exhaust stream. Shown in FIG. 1 is a medium temperature CO catalyst 130, then an ammonia injection grid 120, and finally a SCR Catalyst 110 for NOx control.

However, typical gas turbine power plants (GTPP), for example, the conventional combined cycle plant shown in FIG. 1, are typically designed to operate between 50% to 100% load to generate power while maintaining permit emissions compliance levels. Sometimes the plants include Duct Firing to gain capacity above the normal 100% load range. These levels are controlled by utilizing industry standard emissions control equipment. Below approximately 50% load, the gas turbine (GT) emissions can increase dramatically, over a factor of 300. See Table 1A to illustrate the local minimum. Note that there is a local minimum of emissions at 17% GT load in this example.

TABLE 1A

| GT Exhaust Emissions vs. GT Load | | | | |
|---|---|---|---|---|
| GT Load (%) | NOx | CO | VOC | NO/NOx (%) |
| 100 | 15 | 10 | 2 | 79 |
| 50 | 15 | 10 | 2 | 72 |
| 40 | 27 | 850 | 100 | 5 |
| 20 | 35 | 3000 | 1200 | 5 |
| 17 | 30 | 1200 | 280 | 5 |
| 5 | 40 | 2800 | 1500 | 5 |

Note:
Values in ppmvd @ 15% $O_2$ unless noted

This translates into traditional stack emissions as indicated in Table 1B for NOx, CO, and VOC. The upper load range from 100% load to approximately 50% load is where emissions compliance is achievable. The 50% load is where the emission from the GT are at a low enough level that the traditional post combustion clean up equipment can destroy enough emissions to have compliant levels at the stack. This 50% load point is often referred to as Minimum Emissions Compliant Load (MECL) for a gas turbine. The unit is out of emissions compliance at GT load ranges<approximately 50% load. This is a result of the engine characteristics at lower GT loads: a large increase in emissions and a large increase in the NO2 portion of NOx.

TABLE 1B

Stack Exhaust Emissions vs. GT Load, Existing Technology

| GT Load (%) | NOx | CO | VOC |
|---|---|---|---|
| 100 | 2 | 2 | 2 |
| 50 | 2 | 2 | 2 |
| 40 | 13 | 45 | 60 |
| 20 | 16 | 150 | 650 |
| 17 | 13 | 60 | 160 |
| 5 | 18 | 150 | 830 |

Note:
Values in ppmvd @ 15% $O_2$ unless noted

NOx emissions are comprised of NO and NO2. As GT load decreases below 50%, the constituents of the NOx shift from NO to NO2 which is much more difficult to destroy. Selective Catalytic Reduction (SCR) De-NOx reactions, in which NOx is reduced into nitrogen by NH3, generally progress according to reaction (1) below. In cases where NO2 coexists with NO, reactions (2) and (3) occur. If the percentage of NO2 in NOx is less than 50% (GT loads≥50%), NO2 and NO are removed by reaction (2), and the NO that remains is removed by reaction (1). If the percentage of NO2 in NOx is higher than 50% (GT loads<approximately 50%), NO2 in the remaining NOx component becomes rich as reaction (2) progresses. Under this circumstance, the De-NOx reaction drops significantly because reaction (3) is slow.

$$4NO+4NH3+O2=>4N2+6H2O \quad (1)$$

$$NO+NO2+2NH3=>2N2+3H2O \quad (2)$$

$$6NO2+8NH3=>7N2+12H2O \quad (3)$$

Traditional GTPP's may have an oxidation (CO) catalyst 130, an ammonia injection grid 120 and a SCR (NOx) catalyst 110 for controlling the emissions in the GT exhaust path, typically where the temperature is in the range of 500° F. to 700° F. (although somewhat higher temperatures are typical for gas turbine simple cycle plants). This equipment is typically located downstream of the HP evaporator tubes in combined cycle applications, where the temperature of the exhaust is appropriate for these chemical reactions to occur effectively. The traditional SCR catalyst 110 is designed to destroy relatively high concentrations of NO, and relatively low quantities of NO2.

SUMMARY OF THE INVENTION

In view of the above stated problems, it is one aspect of the present invention to allow gas turbine power plants (simple cycle, combined cycle or co-generation) to operate continuously from 100% load down to approximately 40% load, and also at a very low load setpoint(s) (where there is a local minimum of GT emissions) or from 100% load continuously down to the local minimum while maintaining stack emissions compliance.

According to another aspect of the present invention cumulative emissions during startups and shutdowns of the gas turbine power plant will also be significantly reduced. This may be achieved via the addition of a series of oxidation (CO) catalysts (two or more) and, if necessary, a high NO2 reduction or multi-pollutant SCR catalyst in the exhaust path, along with other salient features such as control system modifications and steam cycle management strategies.

In accordance with an aspect of the present invention an apparatus for a gas turbine power plant that uniquely configures emission control equipment such that the plant can extend the emissions compliant operational range, said apparatus comprising a oxidation (CO) catalyst. According to another aspect of the present invention a method for operating a gas turbine power plant with the apparatus is provided such that the plant can extend the emissions compliant operational range. According to another aspect of the present invention the apparatus further comprises a SCR catalyst downstream of said oxidation catalysts that reduces NOx emissions to maintain emissions compliance at low loads as well as normal operating loads. According to another aspect of the present invention the apparatus further comprises at least one SCR catalyst that is capable of a high NO2 conversion rate and reduces NOx emissions to maintain emissions compliance at low loads as well as normal operating loads. According to another aspect of the present invention an existing power plant is retrofitted with said apparatus.

In accordance with an aspect of the present invention an apparatus for a gas turbine power plant that uniquely configures emission control equipment such that the plant can operate in emissions compliance at specific load(s) below the MECL where the gas turbine emissions are at or near a local minimum, or from 100% load continuously down to the local minimum, said apparatus comprising a oxidation (CO) catalyst. According to another aspect of the present invention a method for operating a gas turbine power plant with the apparatus is provided such that the plant can operate in emissions compliance at specific load(s) below the MECL where the gas turbine emissions are at or near a local minimum, or from 100% load continuously down to the local minimum. According to another aspect of the present invention, the apparatus further comprises a SCR catalyst downstream of said oxidation catalyst that reduces NOx emissions to maintain emissions compliance at low loads as well as normal operating loads. According to another aspect of the present invention, the apparatus further comprises at least one catalyst that is capable of a high NO2 conversion rate and reduces NOx emissions to maintain emissions compliance at low loads as well as normal operating loads. According to another aspect of the present invention an existing power plant is retrofitted with said apparatus.

In accordance with an aspect of the present invention an apparatus for a gas turbine power plant that uniquely configures emission control equipment such that emissions during start-up and shut-down are significantly reduced, said apparatus comprising a oxidation (CO) catalyst. According to another aspect of the present invention a method for operating a gas turbine power plant with the apparatus is provided such that emissions during start-up and shut-down are significantly reduced. According to another aspect of the present invention the apparatus further comprises a SCR catalyst downstream of said oxidation catalyst that reduces NOx emissions to maintain emissions compliance at low loads as well as normal operating loads. According to another aspect of the present invention the apparatus further comprising at least one catalyst that is capable of a high NO2 conversion rate and reduces NOx emissions to maintain emissions compliance at low loads as well as normal operating loads. According to another aspect of the present invention an existing power plant is retrofitted with said apparatus.

In accordance with an aspect of the present invention ail apparatus for a gas turbine power plant that uniquely configures emission control equipment such that the plant can extend the emissions compliant operational range, said apparatus comprising at least one catalyst that is capable of a high NO2 conversion rate and reduces NOx emissions to maintain emissions compliance. According to another aspect of the present invention a method for operating a gas turbine power plant with the apparatus is provided such that the plant can extend the emissions compliant operational range and/or significantly reduce start-up and shut-down emissions. According to another aspect of the present invention an existing power plant is retrofitted with said apparatus.

BRIEF DESCRIPTION OF THE DRAWINGS

Further characteristics and advantages of the present invention will be more readily apparent from the description of the preferred but non-exclusive embodiments of the power plant and method, illustrated by way on non-limiting example in the accompanying drawings, in which.

The same reference numerals have been used to identify similar elements in FIGS. 1 and 2.

DETAIL DESCRIPTION OF THE PREFERRED EMBODIMENTS

In the following, an embodiment of the present invention in which emissions control equipment is designed and configured differently, and is optimized for a broader operating range and lower emissions at low loads is described with reference to FIG. 2. That, is, a GTPP designed with or without duct burners and operated in accordance with the embodiments of the present invention enables the example plant to operate at loads lower than 50% while maintaining stack emission compliance of low levels by uniquely utilizing emission control equipment and other salient features.

Figure 1:
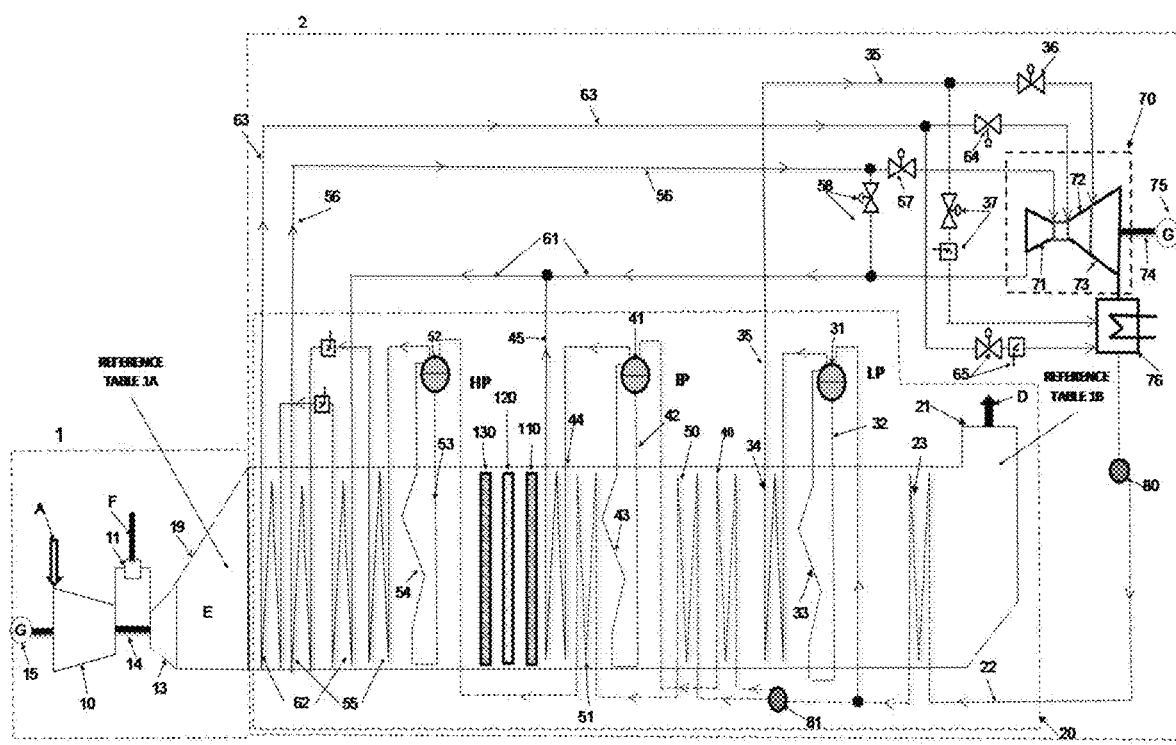
FIG. 1 shows a conventional three pressure, reheat, combined cycle plant configuration, based on a gas turbine ("GT"), a heat recovery steam generator ("HRSG"), and a steam turbine ("ST"). The HRSG is also sometimes known as a waste heat steam generator.
Figure 2:
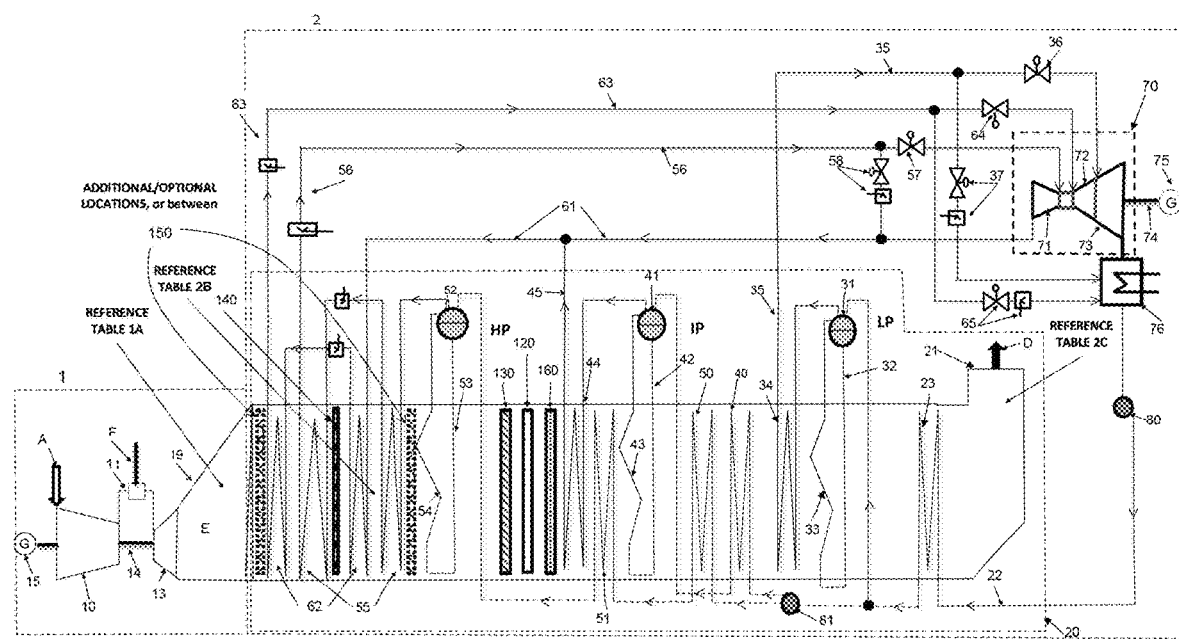
FIG. 2 shows a combined cycle plant configuration according to an embodiment of the present invention.

Specifically, as shown in FIG. 2, the emissions control equipment may include one or more CO catalysts 130, 140 and 150 as well as a secondary catalyst 160, also referred to herein as a "SCR catalyst". The secondary catalyst 160 may be one or a combination of a standard SCR catalyst, a special high NO2 reduction SCR catalyst, or a multi-pollutant SCR catalyst designed to simultaneously destroy CO/VOCs as well as NO2 and NOx emissions. An example of such a multi-pollutant SCR catalyst is the METEOR multi-pollutant SCR catalyst available from Cormetech, Inc. The first catalyst in the gas path is a high temperature CO catalyst 140. This upstream oxidation (CO) catalyst 140 is typically positioned in a high temperature region (>~800° F.) of the exhaust path. If additional CO catalysts 130, 150 are to be used, the upstream catalyst 140 is located upstream of the one or more downstream CO catalysts 130, 150, to make a first reduction of the CO emissions in the exhaust gas stream.

Use of multiple, sequential CO catalysts can significantly improve the total reduction of the incomplete combustion products.

This CO and VOC reduction resulting from multiple, sequential CO catalysts is illustrated by the difference between the original values from the GT in Table 1A to the values shown in Table 2B below (with a local minimum emissions at 17% GT load in this example). This catalyst 140 can be located anywhere upstream of the HP drum and downstream of the GT exhaust (13) depending on the specific plant design/operational conditions.

TABLE 2B

Post High Temp. CO Catalyst Emissions vs. GT Load, New Technology

| GT Load (%) | NOx | CO | VOC |
|---|---|---|---|
| 100 | 15 | 2 | 2 |
| 50 | 15 | 2 | 2 |
| 40 | 27 | 43 | 20 |
| 20 | 35 | 150 | 642 |
| 17 | 28 | 60 | 50 |
| 5 | 38 | 140 | 829 |

Note:
Values in ppmvd @ 15% $O_2$ unless noted

If utilized, one or more downstream oxidation (CO) catalysts 130, 150 are located following one or more heat exchanger, such that the upstream CO catalyst 140 is disposed upstream of a heat exchanger and the one or more downstream CO catalysts 130, 150 are positioned downstream of the heat exchanger, such as the HP superheater 55, reheater 62, or HP evaporator, for example. Accordingly the downstream CO catalysts 130, 150 are disposed within a lower temperature region (<~800° F.) of the exhaust path to make additional reductions of the CO emissions in the exhaust gas stream.

As shown in FIG. 2, the SCR catalyst 160 such as the special high NO2 reduction SCR catalyst 160 or multi-pollutant catalyst 160 is located downstream of the CO catalysts 130, 140, 150 and one or more of various heat exchangers, typically in a medium temperature region (approx. 500° F. to 750° F.) of the exhaust path to reduce NOx emissions that may contain high concentrations of NO2. However, if high NO2 concentrations do not exist, the standard SCR catalyst 160 or the multi-pollutant catalyst 160 can be employed. The SCR catalyst 160 designed for high NO2 reduction or the multi-pollutant catalyst 160 are contemplated to be most beneficial for low load operation. The high NO2 reduction is achieved by utilizing a special high NO2 reduction SCR catalyst 160. One (of several) such designs is described in U.S. Pat. No. 7,749,938, the contents of which are hereby incorporated by reference in its entirety.

As also shown in FIG. 2 an ammonia injection grid 120 located upstream of the SCR catalyst 160 is designed for both high load and low load flow conditions. Alternatively, the standard SCR catalyst 160 can be used for NOx control in place of the special high NO2 reduction SCR catalyst 160 if high NO2 concentrations do not exist. In addition to the above novelties, additional design and control enhancements may be required to achieve the desired emissions, such as enhanced plant control systems and final stage attemperation. Such equipment and systems are well known, and are therefore not described in detail.

In a method of operating, for example, the combined cycle plant configuration shown in FIG. 2, during normal operation the exhaust gas from the GT first encounters the high temperature CO catalyst 140 where the CO is first reduced to a lower level based on the design. Once the gas passes through it the gas is cooled through various heat exchangers such as the HP superheater 55 and Reheater 62, and then further cooled through the HP boiler drum tubes 54. The catalysts 130, 140, 150 and 160 are designed to operate in this range of exhaust temperature in order to maintain the emissions at the required stack 21 levels. If utilized, the medium temperature CO catalyst 130 will be disposed downstream of one of the heat exchangers and reduce the remaining CO in the gas to permit limits. Optionally, a third CO catalyst 150 can be installed. The ammonia injection grid 120 then injects ammonia into the gas stream, and the mixture is then carried to the SCR catalyst 160 where the NOx is reduced to permit compliant levels.

At lower loads the amount of CO emissions significantly increases to a point that a single CO catalyst, may not destroy enough CO to maintain stack compliant levels. Also, the NOx levels increase and the ratio of NO2 to NO increases, such that the amount of ammonia and SCR catalyst required becomes uneconomical using traditional methods.

During low load and very low load operation, the HP drum 52 pressure is maintained in the higher load range (pressure) in order to maintain the high reaction rates in the emissions catalysts. For combined cycle and cogeneration plants, the HP steam circuit is designed and tuned to hold the HP drum 52 pressure up to a point that optimizes the effectiveness of the catalysts in the medium temperature region at lower loads, which is achieved by throttling down on the HP ST inlet control valve.

The multiple reduction in the CO catalysts attains a very high combined CO reduction rate and maintains the low stack emissions at the very low load operation. The specialized NOx catalyst 160 with the enhanced NO2 destruction, when needed, allows for higher concentration of NO2 to be reduced to the acceptable range of NOx exiting the stack.

Table 2C below illustrates one example where stack emissions compliance can be achieved by employing this invention (with a local minimum emissions at 17% GT load in this example). Added layers of catalyst can achieve emissions guaranteed levels from 100% load continuously down to the local minimum.

TABLE 2C

Stack Exhaust Emissions vs. GT Load, New Technology

| GT Load (%) | NOx | CO | VOC |
|---|---|---|---|
| 100 | 2 | 2 | 2 |
| 50 | 2 | 2 | 2 |
| 40 | 2 | 2 | 5 |
| 20 | 6 | 10 | 360 |
| 17 | 4 | 4 | 10 |
| 5 | 6 | 8 | 460 |

Note:
Values in ppmvd @ 15% $O_2$ unless noted

According to another embodiment of the present invention, while it is has been described that the upstream oxidation (CO) catalyst 140 is located upstream of one or more downstream CO catalysts 130, 150, to make a first reduction of the CO emissions in the exhaust gas stream, as shown in FIG. 2, an additional CO catalyst 150 can be provided upstream of the high temperature CO catalyst 140, with one or more heat exchangers 55, 62, 54 disposed therebetween in order to provide additional reduction of the CO emissions in the exhaust gas stream if needed.

According to another embodiment of the present invention an existing GTPP can be retrofitted by adding the additional catalyst(s) 140, 150 aforementioned and/or by replacing an existing standard SCR (NOx) catalyst 160 with either the high NO2 SCR catalyst 160 or multi-pollutant SCR catalyst, as appropriate.

According to another embodiment of the present invention, cumulative emissions during startups and shutdowns of the gas turbine power plant will also be significantly reduced. This is achieved primarily by the addition of a series of oxidation (CO) catalysts 130, 140, 150 (two or more) and, if necessary, a high NO2 reduction SCR catalyst 160 in the exhaust path, along with other salient features such as control system modifications and steam cycle management strategies.

In addition, while the embodiments of the present invention have been described with reference to the combined cycle plant configuration, it is readily understood that the aforementioned features of the present invention can used in other plant configuration including but not limited to ST full or partial bypass operation, simple cycle operation, single or double pressure level combined cycles and cogeneration cycles.

From the above description of preferred embodiments of the invention, those skilled in the art will perceive improvements, changes and modifications. Such improvements, changes and modifications within the skill of the art are intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

LIST OF REFERENCE ELEMENTS

Transition Duct 19
HRSG Casing 20
HRSG Stack 21
Low Pressure (LP)
Low Pressure Condensate 22
Low Pressure (LP) Economizer 23
LP Boiler Drum 31
LP Downcomer 32
LP Evaporator 33
LP Superheater 34
Pipe to LP Section (73) of ST 70 via line 35
LP Valve 36—for FIG. 2 component has added tuned operational range
LP Bypass Valve & De-superheater 37
Intermediate Pressure (IP)/Reheat
IP Economizer 40
IP Steam Drum 41
IP Downcomer 42
IP Evaporator 43
IP Superheater 44
Pipe to Cold Reheat pipe (61) 45
High Pressure (HP)
HP Economizer 50
HP Economizer 51

HP Steam Drum 52
Downcomer 53
HP Evaporator 54
HP Superheater 55
Pipe to HP Section (71) of ST 70 via line 56
Valve (HP) 57—for FIG. 2 component has added tuned operational range
HP Bypass Valve & De-superheater 58
Hot Reheat (HRH)
Cold Reheat Pipe 61
Reheat Section 62
Hot Reheat Pipe to IP Section (72) of ST 70 via line 63
RH Valve 64—for FIG. 2 component has added tuned operational range
RH Bypass Valve & De-superheater 65
ST & Condensate
ST 70
HP Steam Turbine 71
IP Steam Turbine 72
LP Steam Turbine 73
Common Turbine Shaft 74
Generator 75
Condenser 76
Condensate Pump 80
Boiler Feed Pump 81
Selective Catalytic Reduction (deNOx) 110 Ammonia Injection Grid 120
Medium Temp Oxidation Catalyst Location 130
High Temp Oxidation Catalyst 140
High Temp Oxidation Cat Optional Location Range 150
Secondary Selective Catalytic Reduction 160
Working Fluids
A—Ambient Air
D—Stack Discharge
E—GT Exhaust
F—Fuel

We claim:

1. A method for operating a gas turbine power plant with an apparatus comprising an enclosure through which exhaust gas of a gas turbine of the gas turbine power plant must flow; only one Selective Catalytic Reduction (SCR) catalyst; and a plurality of carbon monoxide (CO) oxidation catalysts arranged in sequential series such that all of the exhaust gas flows through each CO catalyst of the plurality of CO oxidation catalysts, wherein the Selective Catalytic Reduction (SCR) catalyst is located downstream of said plurality of CO oxidation catalysts, the gas turbine power plant including emission control equipment, the method comprising:

operating the gas turbine at a load point below 50% load;

passing the exhaust gas through a first CO catalyst of the plurality of CO oxidation catalysts to reduce emissions to a first level; and passing the exhaust gas through a second CO catalyst of the plurality of CO oxidation catalysts to reduce emissions to a second level, the second level being lower than the first level.

* * * * *